United States Patent
Jeon

(10) Patent No.: US 6,450,645 B1
(45) Date of Patent: Sep. 17, 2002

(54) REFLECTION TYPE PROJECTOR INCLUDING A SHEET POLARIZATION BEAM SPLITTER AND A CORRECTION MECHANISM WHICH CORRECTS AN ABERRATION OF THE INCIDENT LIGHT CAUSED BY THE SHEET POLARIZATION BEAM SPLITTER

(75) Inventor: Kee-uk Jeon, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/557,147

(22) Filed: Apr. 25, 2000

(30) Foreign Application Priority Data

Apr. 26, 1999 (KR) .............................. 99-14879

(51) Int. Cl.[7] .................. G03B 21/14; G03B 21/00; G02F 1/1335
(52) U.S. Cl. ................. 353/20; 353/69; 349/9
(58) Field of Search .................. 353/20, 8, 69; 349/9; 359/488, 500

(56) References Cited

U.S. PATENT DOCUMENTS

| | | | | |
|---|---|---|---|---|
| 5,562,334 A | * | 10/1996 | Wortel ........................ | 353/69 |
| 5,748,369 A | * | 5/1998 | Yokota ....................... | 359/487 |
| 5,900,973 A | * | 5/1999 | Marcellin-Dibon et al. . | 359/487 |
| 6,082,861 A | * | 7/2000 | Dove et al. ................. | 353/20 |

FOREIGN PATENT DOCUMENTS

| | | | | |
|---|---|---|---|---|
| JP | 1-121816 | 5/1989 | ........... | G02B/23/00 |
| JP | 1-159611 | 6/1989 | ........... | G02B/24/64 |
| JP | 4-80740 | 3/1992 | ........... | G03B/33/12 |
| JP | 4-149426 | 5/1992 | ........... | G03B/33/12 |
| JP | 6-242373 | 9/1994 | ........... | G02B/13/18 |
| JP | 7-146452 | 6/1995 | ........... | G02B/27/28 |
| JP | 8-292306 | 11/1996 | ............ | G02B/5/04 |
| JP | 9-68416 | 3/1997 | ........... | G01B/11/24 |
| JP | 9-138369 | 5/1997 | ........... | G02B/27/18 |
| JP | 10-111535 | 4/1998 | ........... | G03B/21/20 |
| JP | 10-186547 | 7/1998 | ........... | G03B/33/12 |
| JP | 10-186548 | 7/1998 | ........... | G03B/33/12 |
| JP | 10-206983 | 8/1998 | ........... | G03B/33/12 |
| JP | 10-282434 | 10/1998 | ........... | G02B/23/00 |
| JP | 11-2780 | 1/1999 | ........... | G02B/27/18 |
| JP | 11-15074 | 1/1999 | ........... | G03B/21/00 |

OTHER PUBLICATIONS

Japanese Office Action of JPA 124212 dated Jan. 8, 2000.

* cited by examiner

*Primary Examiner*—Russell Adams
*Assistant Examiner*—Melissa Koval
(74) *Attorney, Agent, or Firm*—Sughrue Mion, PLLC

(57) ABSTRACT

A reflection type projector having a structure so that aberration generated when sheet type PBS is adopted is corrected is provided. The reflection type projector includes a light source, a sheet type PBS arranged to be inclined with respect to an optical axis on a proceeding path of light emitted from the light source, a reflection type display device for generating an image from an incident light polarized in one direction passing the sheet type PBS and reflecting the generated image toward the sheet type PBS, a relay lens unit arranged on an optical path for guiding an incident light by focusing and/or diverging the incident light, a device for correcting aberration of an incident light, arranged on a proceeding path of the light generated from the reflection type display device and passing the sheet type PBS, and a projection lens unit for magnifying and projecting the light transmitting the correction device toward a screen.

19 Claims, 9 Drawing Sheets

REFLECTION TYPE PROJECTOR INCLUDING A SHEET POLARIZATION BEAM SPLITTER AND A CORRECTION MECHANISM WHICH CORRECTS AN ABERRATION OF THE INCIDENT LIGHT CAUSED BY THE SHEET POLARIZATION BEAM SPLITTER

BACKGROUND OF THE INVENTION

1. Field of the Invention

The present invention relates to a reflection type projector adopting a sheet type polarization beam splitter, and more particularly, to a reflection type projector having an improved structure so that aberration of a sheet type polarization beam splitter is corrected.

2. Description of the Related Art

In general, reflection type projection devices are for providing an image by projecting an image generated by a display device using an additional light source onto a screen. Referring to FIG. 1, a conventional reflection type projector includes a light source 10, an optical device 20 for making the light emitted from the light source 10 a uniform and parallel light beam, a cubic polarization beam splitter (PBS) 30 for changing the proceeding path of an input light by transmitting or reflecting the light according to polarization, a reflection type display device 40 for generating an image from a polarized input light input via the cubic PBS 30, and a projection lens unit 50 for magnifying and projecting the light generated from the display device 40 and input through the cubic PBS 30.

The light source 10 includes a lamp 11 for generating light and a reflection mirror 13 for reflecting the light emitted from the lamp 11 and guiding the proceeding path of the light. The optical device 20 includes a glass rod 21 for illuminating a uniform light and a focus lens 23 and a collimating lens 25 for focusing the input diverging light and converting the focused light to a parallel beam.

The cubic PBS 30 includes a mirror surface 31 for reflecting S-polarization light and transmitting P-polarization light of the input light. That is, the S-polarization light of the light emitted from the light source 10 is reflected toward the display device 40 and the P-polarization light is transmitted. Thus, only the S-polarization light of the input light from the light source 10 is used as effective light. Each pixel of the display device 40 is driven independently to selectively polarization-modulate the input light according to a video signal. The light reflected by the display 40 is again input to the cubic beam splitter 30 and the re-input light transmits the cubic PBS 30 in a light amount varying according to the degree of polarization-modulation to P-polarization light to form an image corresponding to the video signal. The projection lens unit 50 magnifies and projects the image transmitting through the cubic PBS 30 on a screen.

In the reflection type projector having the above structure, as the light transmitting through the cubic PBS 30 is symmetrical with respect to an optical axis, a symmetric optical system can be configured. However, in view of the present technical level, the cubic PBS 30 has a lower allowable input angle with respect to the input light than a sheet type PBS. Thus, when the cubic PBS is used, the efficiency of light use is lowered due to the lower allowable input angle.

To increase the efficiency of light use in the cubic PBS approximate to the sheet type PBS, an optical device for emitting collimating light exhibiting low diverging angle and focusing angle is needed. In this case, the light source should be greater in size, which is a disadvantage in configuring a compact optical system.

Also, in the case in which the sheet type PBS is adopted to change the proceeding path of light, the configuration of the light source and the optical device is made easy due to a large allowable input angle, while aberration occurs so that the light transmitted through the sheet type PBS deviates from the optical axis.

SUMMARY OF THE INVENTION

To solve the above problems, it is an objective of the present invention to provide a reflection type projector adopting a sheet type PBS to increase the allowable input angle and having an improved structure so that aberration of the sheet type PBS can be corrected.

Accordingly, to achieve the above objective, there is provided a reflection type projector which comprises a light source, a sheet type PBS arranged to be inclined with respect to an optical axis on a proceeding path of light emitted from the light source, a reflection type display mechanism which generates an image from an incident light polarized in one direction passing through the sheet type PBS and reflects the generated image toward the sheet type PBS, a relay lens unit arranged on an optical path for guiding an incident light by focusing and/or diverging the incident light, a mechanism for correcting aberration of an incident light, arranged on a proceeding path of the light generated from the reflection type display mechanism and passing through the sheet type PBS, and a projection lens unit for magnifying and projecting the light transmitted through the correction mechanism toward a screen.

To achieve another aspect of the above object, there is provided a reflection type projector which comprises a light source, an illumination unit for converting light emitted from the light source to a uniform light, a relay lens unit arranged on an optical path for guiding an incident light by focusing and/or diverging the incident light, a device for branching the light polarized in one direction transmitted through the polarization converter according to a wavelength range thereof, a sheet type PBS arranged on a proceeding path of each of the lights branched by the light branching mechanism for converting a proceeding path of the light according to the direction of polarization of an incident light, a reflection type display mechanism which generates an image from an incident light polarized in one direction passing through the sheet type PBS, a color prism for selectively transmitting or reflecting an incident light generated from the reflection type display machanism and passing through the sheet type PBS according to a wavelength thereof, an aberration correcting mechanism for correcting aberration of an incident light, arranged on a proceeding path of the light generated from the reflection type display mechanism and passing through the sheet type PBS, and a projection lens unit for magnifying and projecting light input from the color prism toward a screen.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 2:
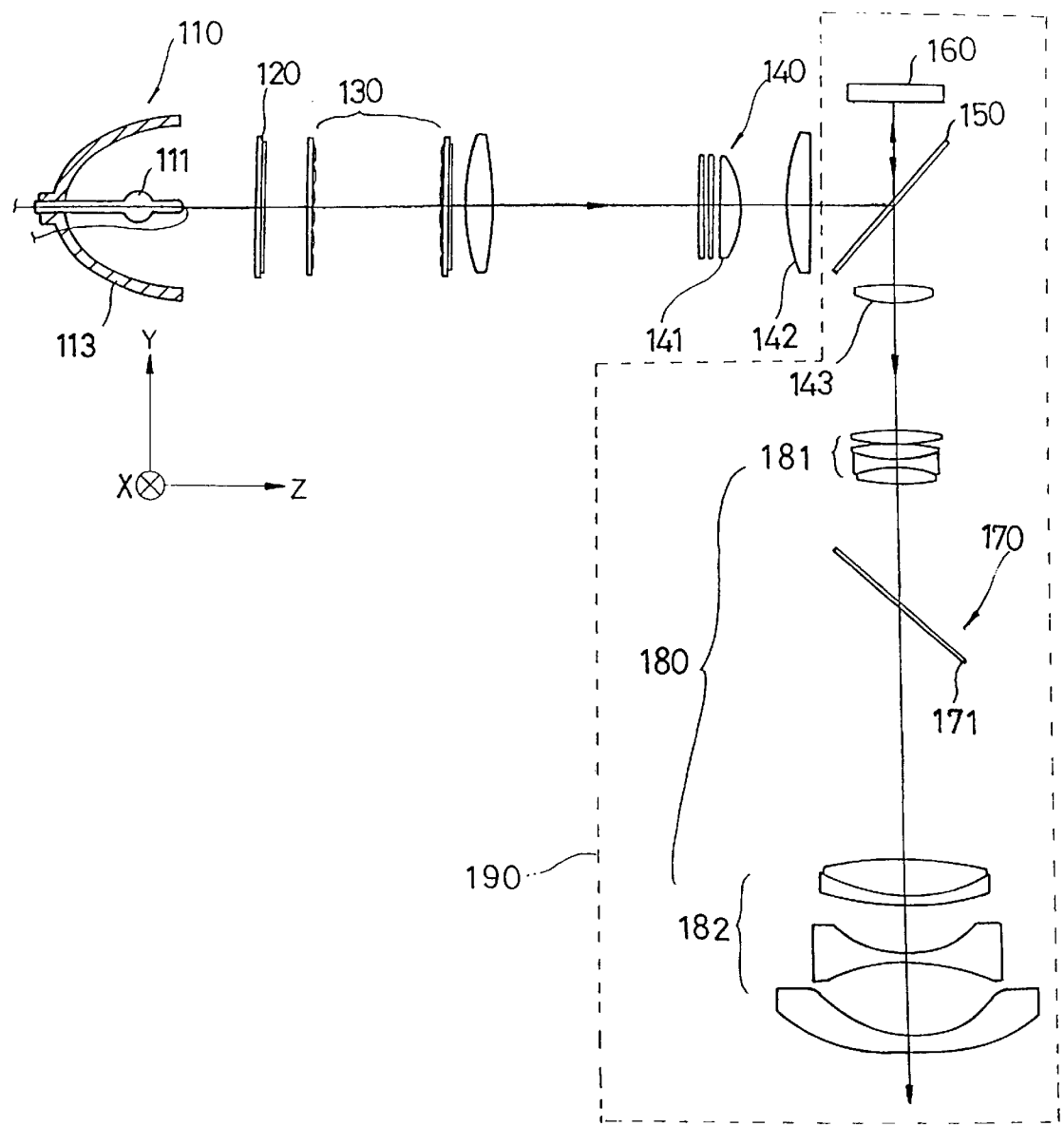
FIG. 2 is a view showing the optical arrangement of a reflection type projector according to a preferred embodiment of the present invention.

Referring to FIG. 2, a reflection type projector according to the present invention includes a light source 110, a sheet type polarization beam splitter (PBS) 150 for transmitting or reflecting input light according to polarization, a reflection type display, mechanism 160 for generating an image and reflecting the generated image, a relay lens unit 140 for focusing and/or diverging input light to guide the proceeding path of the input light, a correction mechanism 170 for correcting aberration with the sheet type PBS 150, and a projection lens unit 180 for magnifying and transmitting input light toward a screen (not shown).

The light source 110 consists of a lamp 111 for generating light, and a reflection mirror 113 for reflecting the light emitted from the lamp 111 to guide the proceeding path of the light. The reflection mirror 113 may be an oval mirror having one focal point at the position of the lamp 111 and the other focal point at the position at which the light is focused, or a parabolic mirror having one focal point at the position of the lamp 111 and such that the light emitted from the lamp 111 and reflected from the reflection mirror 113 can become a parallel beam.

Preferably, the reflection type projector further includes an illumination unit 130 for making the light emitted from the light source 110 a uniform light, disposed on the optical axis between the light source 110 and the sheet type PBS 150. A fly-eye lens as shown in the drawing or a glass rod (not shown) can be provided as the illumination unit 130.

Also, it is preferable that a band filter 120 for transmitting only light within a visual wavelength range among the light emitted from the light source 110 is further included, which is disposed on the optical axis between the light source 110 and the sheet type PBS. That is, the band filter 120 cuts off infrared and ultraviolet rays emitted from the lamp 111.

The sheet type PBS 150 is disposed to be inclined with respect to the optical axis on the optical path between the illumination unit 130, the reflection type display mechanism 160 and the projection lens unit 180. The sheet type PBS 150 changes the proceeding path of the light by transmitting or reflecting the input light according to polarization. For example, S-polarization light of the input light is reflected to proceed toward the reflection type display mechanism 160 and P-polarization light is transmitted, so that P-polarization light input from the reflection type display mechanism 160 proceeds toward the projection lens unit 180. Here, P-polarization light of the input light transmits the sheet type PBS 150 to proceed toward the reflection type display mechanism 160 and S-polarization light is reflected, so that the S-polarization light input from the reflection type display mechanism 160 may proceed toward the projection lens unit 180.

Figure 1:
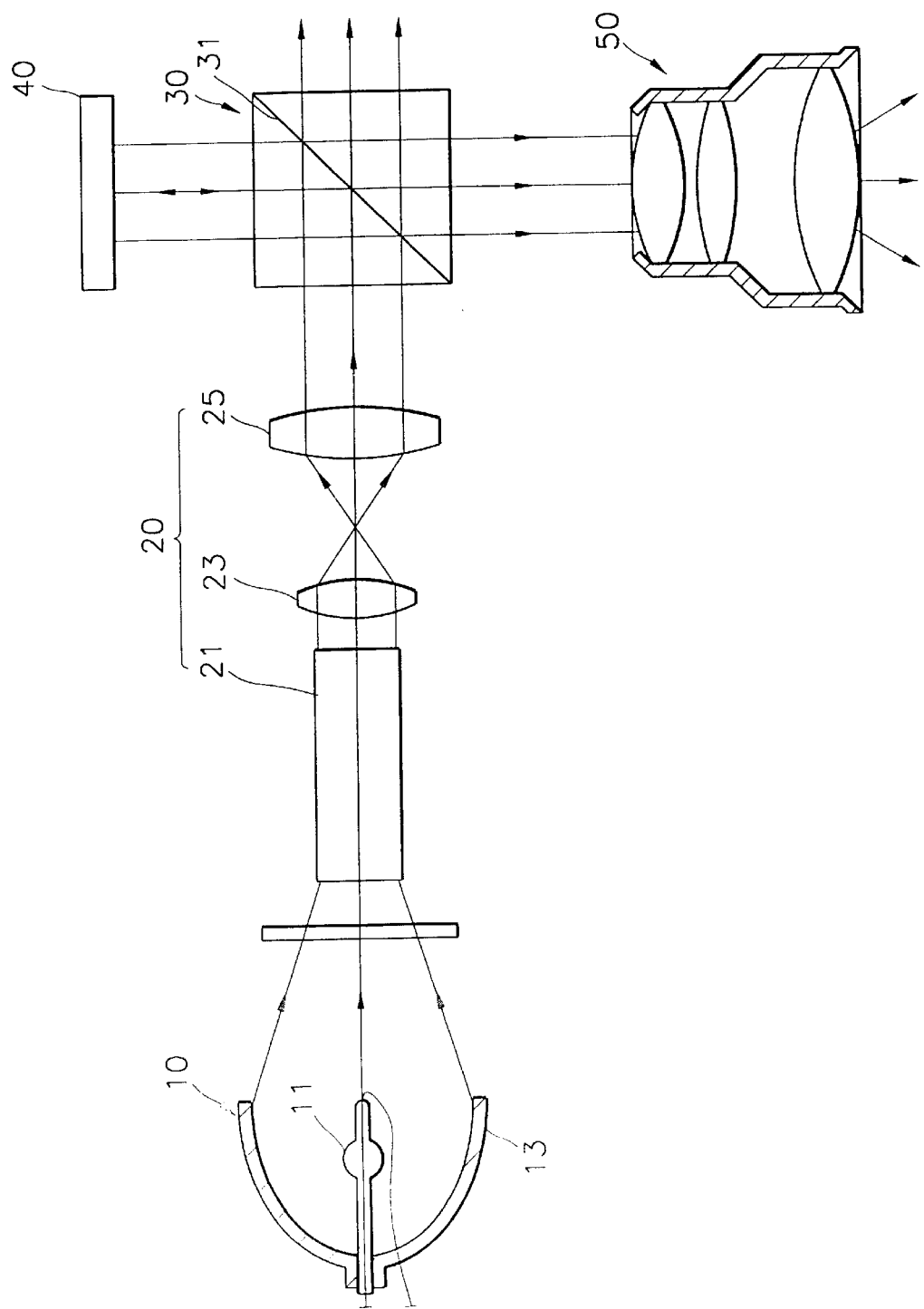
FIG. 1 is a view showing the optical arrangement of a conventional reflection type projector.

The sheet type PBS 150 has a larger allowable input angle than that of the cubic PBS 30 of FIG. 1. Thus, as the usable light amount included in the allowable input angle becomes greater, usability of light in the optical system increases accordingly.

A ferroelectric liquid crystal display (FLCD) exhibiting a superior responding speed, that is, the on/off time of liquid crystal is shorter than other LCD mechanisms, is provided as the reflection type display mechanism 160. The reflection type display mechanism 160 has pixels of a two-dimensional array structure. Each pixel is driven independently and selectively changes the direction of polarization. Thus, in the reflection type display mechanism 160, each pixel is selectively driven to correspond to the input video signal to modulate the direction of polarization, so that a predetermined image is generated:

The relay lens unit 140 is for obtaining the proceeding path of light by focusing and diverging the input light and is comprised of a plurality of lenses 141, 142 and 143. The lens 143 reduces the divergent angle with respect to the beam reflected from the reflection type display mechanism 160 to minimize the diameter of the projection lens unit 140 or the size of the color prism (not shown). The lens 143 is arranged on the optical path between the sheet type PBS 150 and the projection lens unit 180 as a part of the projection lens unit 180. Here, the lens 143 may be omitted. Each lens forming the relay lens unit 140 is disposed between the light source 110 and the sheet type PBS 150. Here, as the sheet type PBS 150 is arranged to be inclined in one direction, astigmatism occurs with respect to the inclined direction.

Figure 3:
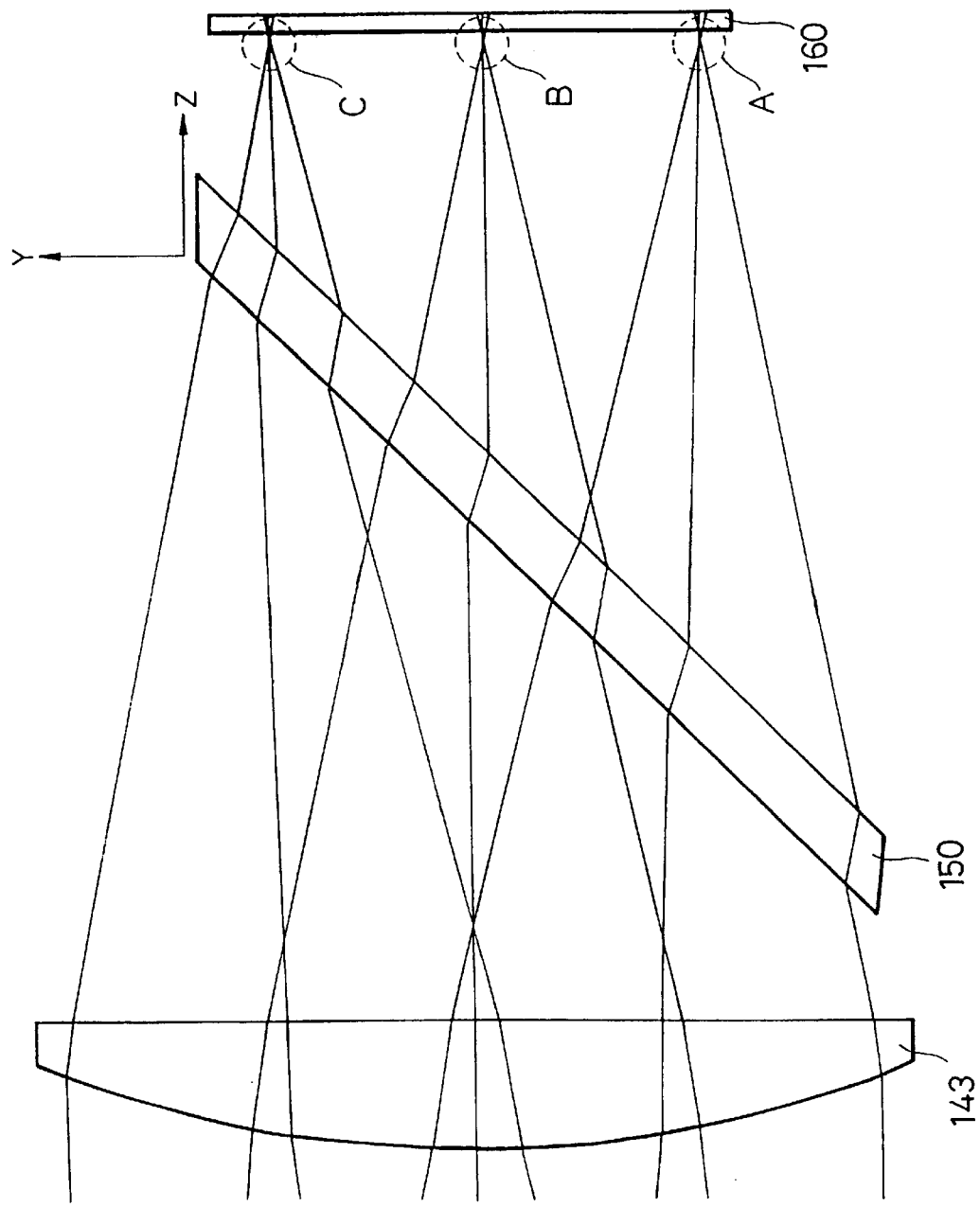
FIG. 3 is a view showing the optical arrangement of the sheet type PBS with respect to the Y–Z plane of FIG. 2.
Figure 4:
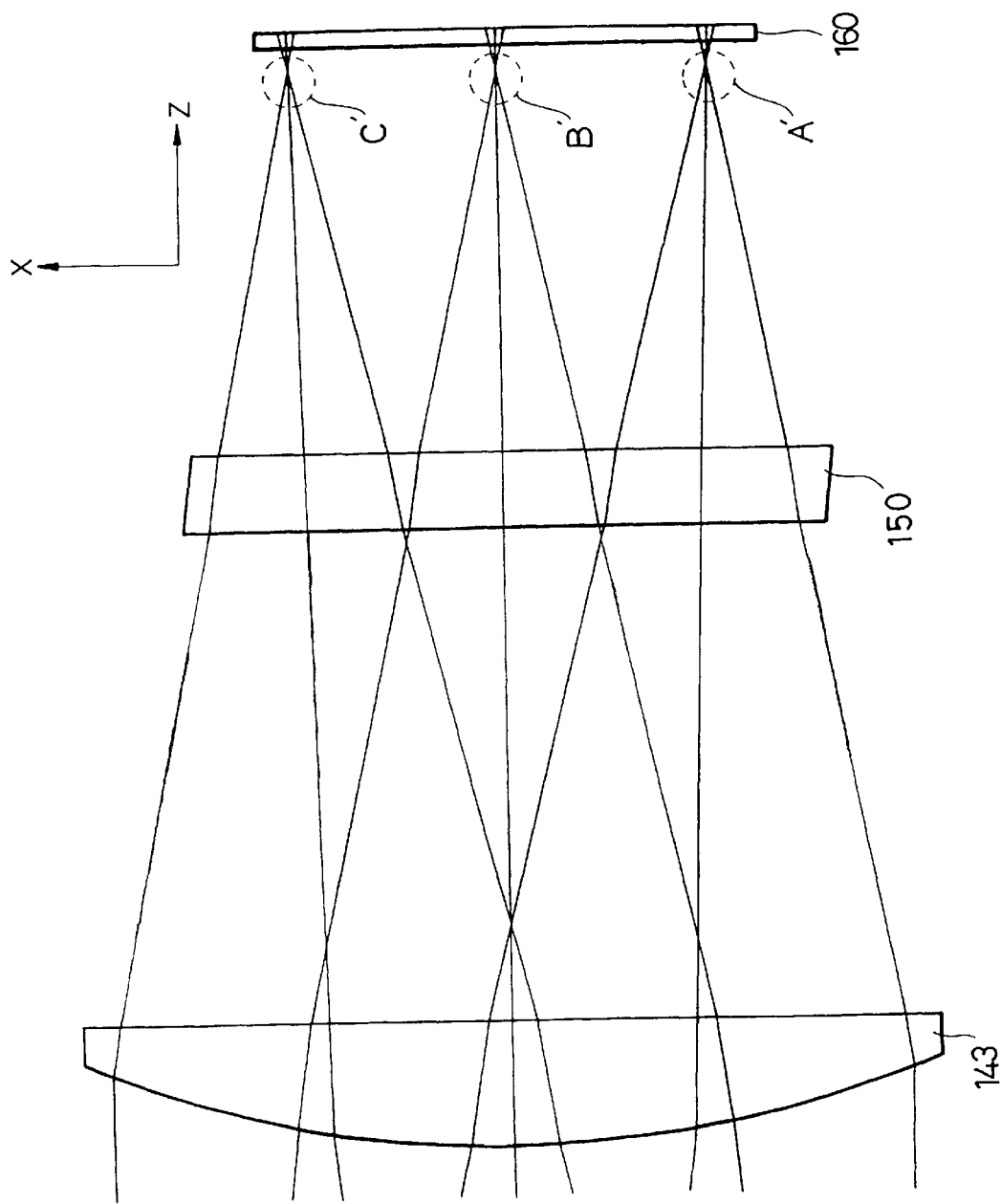
FIG. 4 is a view showing the optical arrangement of the sheet type PBS with respect to the X–Z plane of FIG. 2.

FIG. 3 shows the optical arrangement of the sheet type PBS 150, the lens 143 forming the projection unit 190, and the reflection type display mechanism 160 with respect to the Y–Z plane of FIG. 2. FIG. 4 is a view showing the optical arrangement of the sheet type PBS 150, the lens 143 and the reflection type display mechanism 160 with respect to the X–Z plane of FIG. 2.

Referring to FIG. 3, as the sheet type PBS 150 is inclined on the Y–Z plane, aberration occurs to the light proceeding toward the reflection type display mechanism 160 as shown in portions indicated by A, B and C. As shown in FIG. 4, aberration does not occur to the sheet type PBS 150 disposed on the X–Z plane perpendicular to the optical axis. Also, the position of focus on the Y–Z plane is different from the position of focus on the X–Z plane. The aberration differently occurring with respect to the two planes, that is, astigmatism, is not corrected by a common lens and thus becomes a hindrance to adoption of the sheet type PBS 150.

Preferably, the correction mechanism 170, as shown in FIG. 2, includes a correction panel 171 disposed to be inclined a predetermined angle in the same direction as that of the sheet type PBS 150 or in the reverse direction thereof on the optical axis between a first-half projection lens unit 181 and a rear-half projection lens unit 182. The correction panel 171 is a transparent panel having a predetermined thickness, disposed to be inclined to the optical axis with respect to the Y–Z plane and perpendicular to the optical axis with respect to the X–Z plane. By arranging the correction panel 171 to be inclined to the optical axis, the aberration caused on the Y–Z plane due to the sheet type PBS 150 can be corrected. As the thickness and the degree of inclination of the correction panel 171 are the design factors which can be changed according to the thickness and the inclination angle of the sheet type PBS 150, a detailed description thereof will be omitted.

Figure 5:
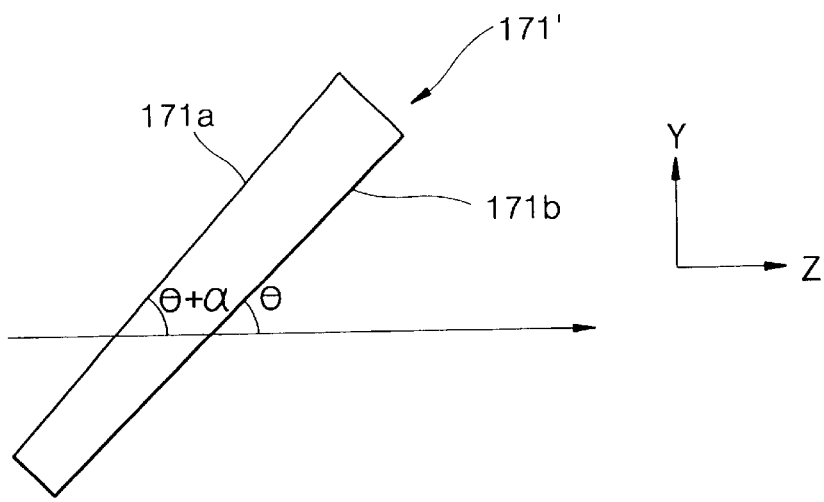
FIG. 5 is a view showing the optical arrangement of a correction plate according to the preferred embodiment of the present invention.

Also, as shown in FIG. 5, a correction panel 171' preferably has an incident surface 171a' and a transmitting surface 171b', and is a wedge-shaped structure such that the angle ($\theta+\alpha$) made by the optical axis and the incident surface 171a' is different from the angle made by the optical axis $\theta$ and the transmitting surface 171b', to improve aberration correction performance. Here, $\theta$ is approximately 45° and $\alpha$ is approximately 0.25°.

Figure 6:
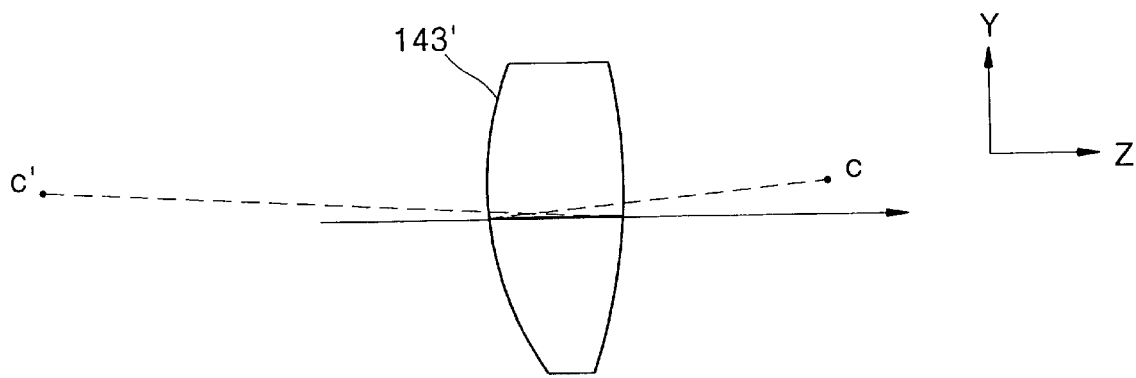
FIG. 6 is a view showing the optical arrangement of a wedge type lens according to the preferred embodiment of the present invention.

Referring to FIGS. 2 and 6, the correction mechanism 170 can further include a wedge-shaped lens 143'. The wedge-shaped lens 143' is an element of the projection unit 190 and is made by changing the shape of the lens 143 disposed on the optical axis between the projection lens unit 180 and the sheet type PBS 150, or changing some lenses of the projection lens unit 180. The wedge-shaped lens 143' is disposed such that the center of curvature C of the incident surface and/or the center of curvature C' of the transmitting surface can be deviated from the optical axis (direction Z).

Figure 7:
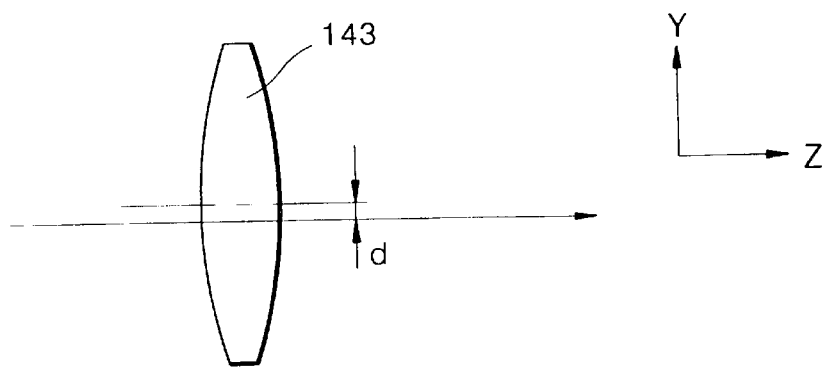
FIG. 7 is a view showing the optical arrangement of a lens arranged to be shifted from the optical axis according to the preferred embodiment of the present invention.

Also, as shown in FIGS. 2 and 7, in addition to the correction plate 171, as the correction mechanism 170, at least one lens 143 disposed on the path between the projection lens unit 180 and the sheet type PBS 150 or some lenses of the projection lens unit 180 is arranged to be shifted a distance d from the incident optical axis on the Y-Z plane where the sheet type PBS 150 is disposed to be inclined, so that aberration correction performance is improved.

Figure 8:
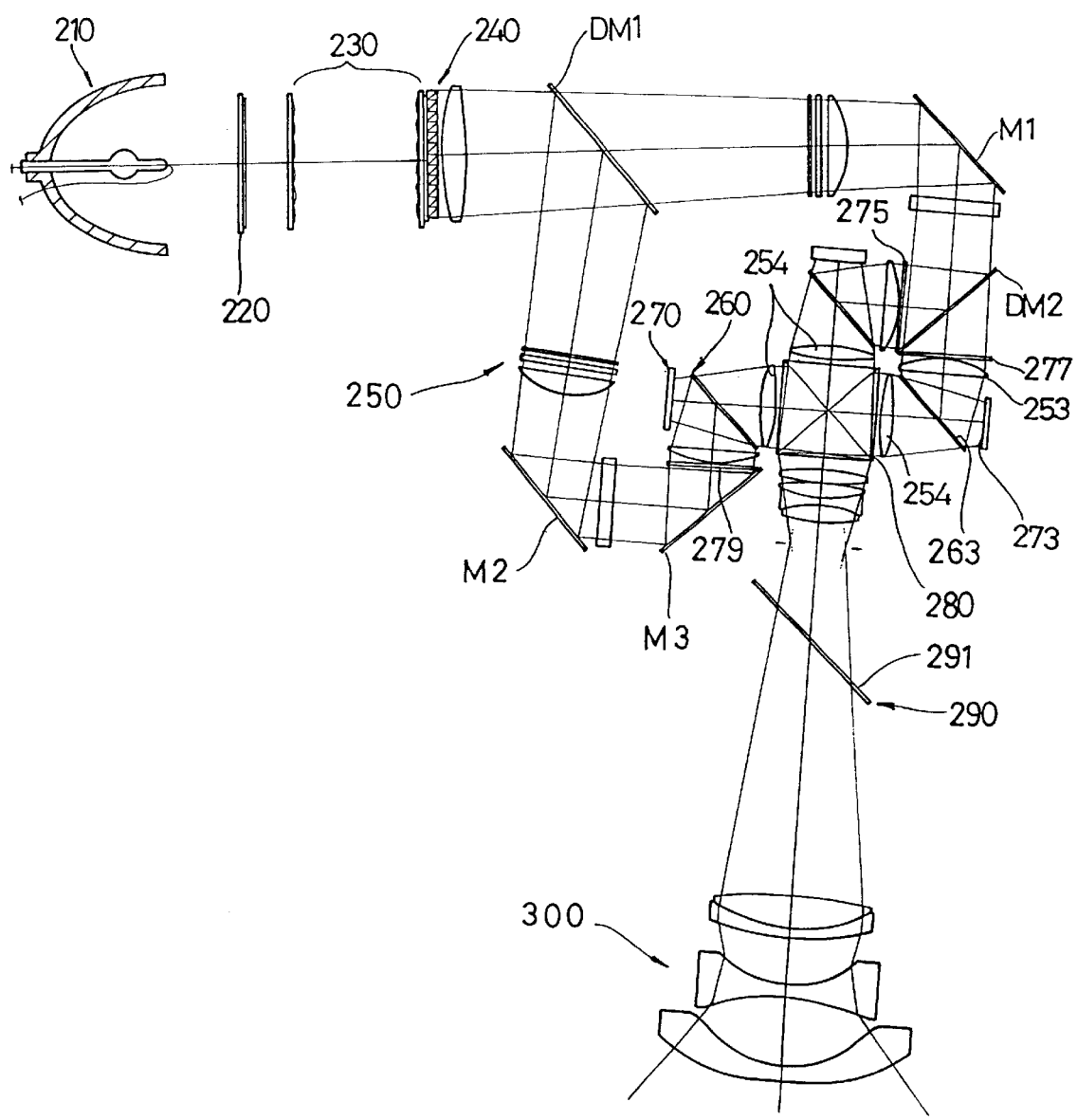
FIG. 8 is a view showing the optical arrangement of a reflection type color projector according to the present invention.

In the operation of the reflection type color projector according to another preferred embodiment of the present invention, referring to FIG. 8, a reflection type color projector includes a light source 210, an illumination unit 230 for converting light emitted from the light source 210 to uniform light, a polarization converter 240 for converting non-polarized light emitted from the light source 210 to light polarized in one direction, a relay lens unit 250 for guiding the proceeding path of incident light by focusing and/or diverging the incident light, a light branching mechanism or branching incident light according to the wavelength range thereof, a plurality of sheet type PBSs 260 for converting the proceeding paths of the respective branched light beams, a plurality of reflection type display mechanism 270 for generating an image from the incident light polarized in one direction passing through the sheet type PBSs 260, a color prism 280 for projecting an image generated from the reflection type display mechanism 270 to one path, a correction mechanism 290 for correcting aberration caused by adopting the sheet type PBSs 260, and a projection lens unit 300 for magnifying and transmitting light input from the color prism 280. Here, as the functions of the light source 210 and the illumination unit 230 are substantially the same as those of the light source 110 and the illumination unit 130 shown in FIG. 2, a detailed description thereof will be omitted.

Also, the present invention preferably includes a bandpass filter 220 for blocking light within infrared light and ultraviolet light ranges of the incident light on an optical path. The polarization converter 240 is an optical member for converting the non-polarized light emitted from the light source 210 to light polarized in one direction.

Figure 9:
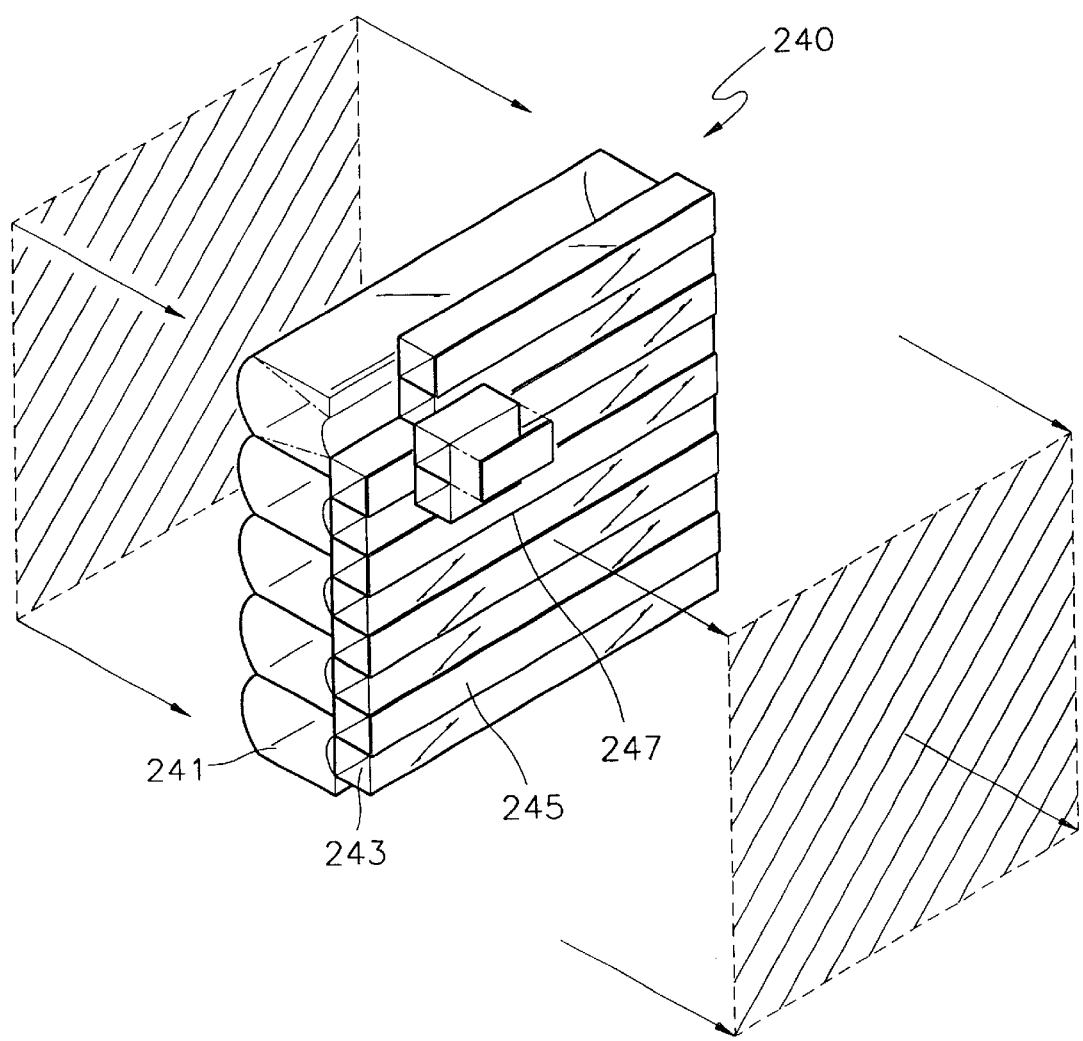
FIG. 9 is an exploded perspective view showing the optical arrangement of a polarization convertor according to the preferred embodiment of the present invention.
Figure 10:
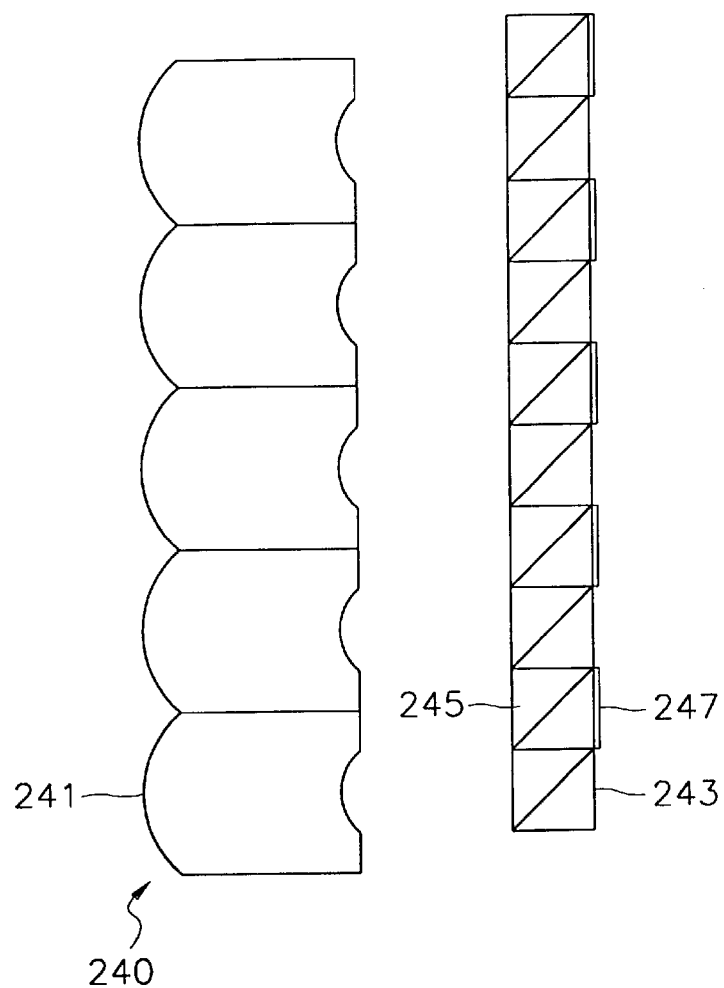
FIG. 10 is a view showing the optical arrangement of the polarization convertor according to the present invention.
Figure 11:
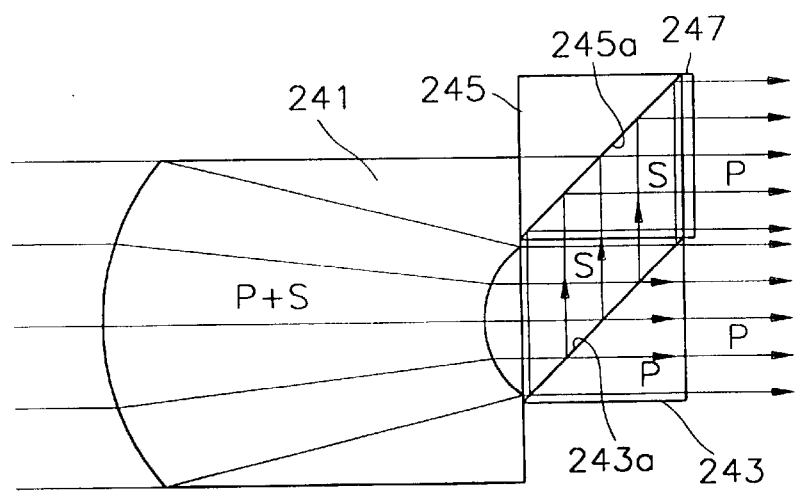
FIG. 11 is a view for explaining the operation of the polarization convertor shown in FIG. 9.

Referring to FIGS. 9 through 11, the polarization converter 240 includes a cylindrical lens array 241, PBSs 243, a reflection member 245 and a phase delay plate 247. The cylindrical lens array 241 converts the incident light emitted in parallel to a parallel beam having a reduced sectional size by focusing and diverging the incident light emitted in parallel and is provided to minimize loss of the incident light in securing an installation space of the reflection member 245. A plurality of the PBSs 243 are provided and each splitter has a mirror surface 243a, installed to face a light transmitting surface of the cylindrical lens array 241, for branching the incident light to the first and second light beams according to polarization. That is, the mirror surface 243a transmits the first light of a predetermined polarization and reflects the second light of the other polarization.

A plurality of the reflection members 245 are provided at the position corresponding to the PBS 243 and each member has a reflection surface 245a for reflecting the second light so that the second light travels in a direction parallel to the first light. The reflection member 245 is disposed at the position secured by the cylindrical lens array 241. The PBS 240 operates as follows. As shown in FIG. 11, non-polarized incident light (P+S) is branched to the first light of P-polarization and the second light of S-polarization at the mirror surface 243a of the PBS 243. The second S-polarized light reflected by the mirror surface 243a is reflected again by the reflection surface 245a to proceed in a direction parallel to the first light. The phase of the second light is delayed as it is transmitted through the phase delay plate 247 and the polarization direction of most light is emitted by being converted to P-polarized light. Thus, the non-polarized light emitted from the light source 210 while being transmitted through the polarization converter 240 is converted to light of one polarization with little loss of light.

The light branching mechanism converts the proceeding path of light by color by selectively transmitting or reflecting the incident light according to the wavelength range thereof. That is, white light of one polarization is branched to red, blue and green light rays. For this, the light branching mechanism is comprised of a first dichromatic mirror DM1 for branching the incident light according to the wavelength range thereof, and a second dichromatic mirror DM2 for branching the light branched by the first dichromatic mirror DM1 again according to the wavelength thereof. For example, the first dichromatic mirror DM1 is manufactured by means of dielectric coating and disposed on the optical axis between the polarization converter 240 and the sheet type PBS 260 to reflect blue light and transmit red and green light of the incident light. The path of the light transmitted through the first dichromatic mirror DM1 is changed by being reflected by the reflection mirror M1. The path of the light reflected by the first dichromatic mirror DM1 is changed by being reflected by the reflection mirrors M2 and M3. The second dichromatic mirror DM2 is disposed on the path of the light reflected by the reflection mirror M1 and branches the incident red and green light beams. That is, red light is reflected and green light is transmitted.

The sheet type PBS 260 is disposed to face each of three incident surfaces of the color prism 280 and reflects the incident light branched by the light branching means and transmits the incident light reflected by the reflection type display mechanism. 270 toward the dichromatic prism 280.

The reflection type display mechanism 270 generates an image from the incident light passing the sheet type PBS 260 and reflects the generated image. The reflection type display mechanism 270 is preferably formed of an FLCD.

Here, first, second and third polarizers 275, 277 and 279 for making only light polarized in one direction of the incident light proceed toward the sheet type PBS 260 is preferably disposed on the optical path between the polarization converter 240 and the sheet type PBS 260.

The color prism 280 has three incident surfaces and one transmitting surface. Each of the three incident surfaces faces each sheet type PBS 260 and converts the proceeding path of the incident light so that the incident light proceeds toward the transmitting surface. For this, the color prism 280 has mirror surfaces at which light is selectively transmitted or reflected according to the wavelength thereof. The mirror surfaces are coated to transmit or reflect according to the wavelength range.

The correction mechanism 290, as shown in FIGS. 3 and 4, is for correcting aberration generated by adopting the sheet type polarization beam splitter 260. The correction mechanism 290, as shown in FIG. 8, includes a correction plate 291 disposed on the optical path between the sheet type PBS 260 and the projection lens unit 300 to be inclined at a predetermined angle in the same direction as the sheet type PBS 260 or reversely.

The correction plate 291 is a transparent plate having a predetermined thickness and disposed to be inclined to the optical axis with respect to the plane on which the sheet type PBS 260 is arranged to be inclined while being disposed perpendicular to the optical axis with respect to the plane on which the sheet type PBS 260 is arranged to not be inclined. As the correction plate 291 is arranged to be inclined with respect to the optical axis, the aberration due to the sheet type PBS 260 can be corrected. As the degrees of the thickness and the inclination of the correction plate 260 are items relating to design which are variable according to the thickness and inclination angle of the sheet type PBS 260, a detailed description thereof will be omitted.

Also, the correction mechanism 290 may further include a wedge-shaped lens 143' of FIG. 6. The wedge-shaped lens 143' is formed by changing the shape of the lens 254 arranged on the optical path in front of the sheet type PBS 260, or changing the shape of some lenses of the projection lens unit 300. As the wedge-shaped lens 143' is described with reference to FIG. 6 in the above, a detailed description thereof will be omitted.

Also, in addition to the correction plate 291, as the correction mechanism 290, at least one lens 254 disposed on the path between the projection lens unit 300 and the sheet type PBS 260 or some lenses of the projection lens unit 300 is arranged to be shifted a distance d from the incident optical axis on the plane where the sheet type PBS 260 is disposed to be inclined, so that aberration correction performance is improved.

Figure 12:
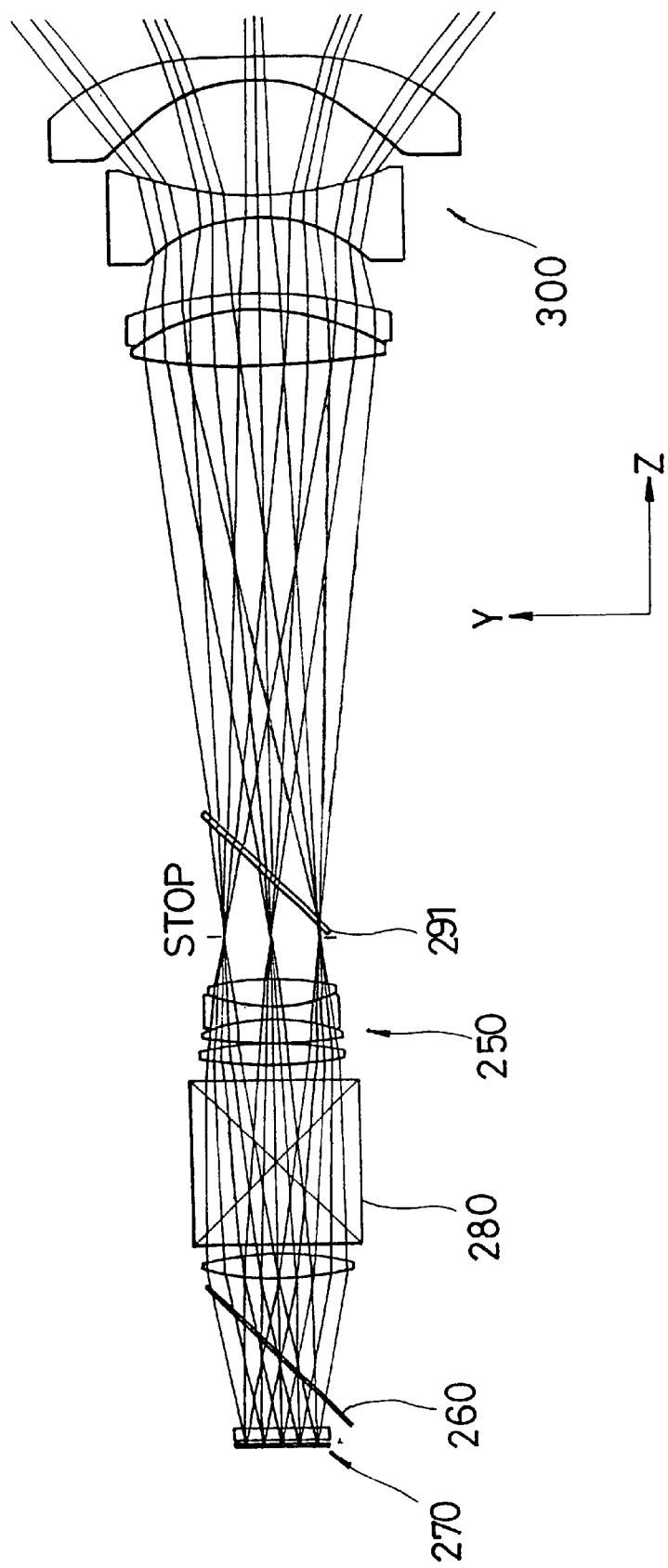
FIG. 12 is a view showing the optical arrangement of part of the optical system of FIG. 8.

The projection lens unit 300 magnifies light transmitted through the correction mechanism 290, which corrects aberration and projects the light toward a screen (not shown). FIG. 12 shows in detail the optical arrangement and the proceeding path of light between the reflection type display mechanism and the projection lens unit in the optical arrangement of the reflection type color projection apparatus shown in FIG. 8.

When the light reflected by the display mechanism 270, passing the sheet type PBS 260 and transmitted through the color prism 280 is viewed from a diaphragm (STOP), it can be seen that aberration occurs in the light. Also, the aberration of light is not corrected after being transmitted through the correction plate 291.

In the operation of the reflection type color projector according to the preferred embodiment of the present invention, with reference to the accompanying drawings, the visible rays of light emitted from the light source 210, while an infrared ray and an ultraviolet ray are cut off by the band filter 220, lands on the illumination unit 230. The incident visible rays are converted to a uniform light as it is transmitted through the illumination unit 230 while maintaining a non-polarization state. The uniform light is transmitted through the polarization converter 240 and is converted to light polarized in one direction, for example, P-polarized light, with little loss of light.

The incident light polarized in one direction is branched to other paths by being transmitted or being reflected by the first dichromatic mirror DM1 according to the wavelength thereof. That is, the light transmitted through the first dichromatic mirror DM1 is branched by the second dichromatic mirror DM2 according to the wavelength thereof. That is, the light transmitted through the second dichromatic mirror DM2 is transmitted through the polarizer 277, is reflected by the, reflection type PBS 263, and is input to a reflection type liquid crystal display mechanism 273.

The reflection type display mechanism 273 modulates the incident light of a predetermined color by pixel corresponding to image signals. That is, the direction of polarization is selectively changed according to the image signals. Thus, light of which polarization is modulated, of the light reflected by the reflection type display mechanism 273, is only transmitted through the sheet type PBS 263 to be input to the color prism 280. Here, as the operation of forming an image corresponding to a predetermined color while being input through other path is the same as described above, a detailed description thereof will be omitted.

The light incident on the color prism 280 through the above three paths is transmitted through the correction plate 291 so that the aberration caused by the sheet type PBS 260 is corrected. The light of an aberration correcting color image is magnified and projected toward the screen through the projection lens unit 300.

As described above, in the reflection type projector according to a preferred embodiment of the present invention, as a sheet type PBS is adopted to increase the allowable input angle and simultaneously correct aberration of the sheet type PBS the efficiency of light can be improved compared to a projector adopting a conventional cubic PBS. Also, the above correction mechanism can be adopted to not only optical apparatuses using the sheet type PBS, but also different types of optical apparatuses adopting an inclined flat panel glass such as a half mirror, for aberration correction use.

What is claimed is:

1. A projector comprising:
   a light source;
   a sheet polarization beam splitter (PBS) arranged to be inclined with respect to an optical axis on a proceeding path of light emitted from the light source;
   a reflection display mechanism which generates an image from an incident light polarized in one direction transmitting the sheet polarization beam splitter and transmits said image toward said sheet polarization beam splitter;
   a relay lens unit arranged on an optical path to guide an incident light by at least one of focusing and diverging said incident light;
   a correcting mechanism which corrects an aberration of said incident light caused by said sheet polarization beam splitter, said correcting mechanism arranged on a proceeding path of the light generated from the reflection display mechanism and transmitting the sheet polarization beam splitter; and a projection lens unit which magnifies and projects a corrected incident light input from the correction mechanism toward a screen.

2. The projector as claimed in claim 1, wherein the aberration correcting mechanism comprises a correction plate arranged on an optical path between the sheet polarization beam splitter and the screen to be inclined at a predetermined angle in at least one of a direction in which the sheet polarization beam splitter is inclined and in a reverse direction thereto.

3. The projector as claimed in claim 1, wherein the aberration correcting mechanism has a light incident surface and a light transmitting surface in which an angle made by an optical axis and the light incident surface is different from an angle made by the optical axis and the light transmitting surface.

4. The projector as claimed in claim 2, wherein the aberration correcting mechanism is formed by at least one lens arranged on an optical path between the sheet polarization beam splitter and at least one of the projection lens unit and a lens of the projection lens unit, said at least one lens having at least one of a center of curvature of a light incident surface of said at least one lens and a light transmitting surface of said at least one lens arranged to be shifted from an optical axis.

5. The projector as claimed in claim 2, wherein the aberration correcting mechanism is formed by at least one lens arranged on an optical path between the sheet polarization beam splitter and the projection lens unit, the at least one lens having a light incident surface and a light transmitting surface in which an angle made by an optical axis and the light incident surface is different from an angle made by the optical axis and the light transmitting surface.

6. The projector as claimed in claim 2, wherein the aberration correcting mechanism is formed by at least one lens arranged on an optical path between the sheet polarization beam splitter and the projection lens unit, said at least one lens arranged to be shifted from an incident light axis on a plane on which the sheet polarization beam splitter is disposed inclined.

7. A projector comprising:

a light source;

an illumination unit for converting a light emitted from the light source to a uniform light;

a relay lens unit arranged on an optical path to guide an incident light by at least one of focusing and diverging the incident light;

a light branching mechanism which branches the incident light polarized in one direction, said incident light transmitted through a polarization converter according to a wavelength range thereof;

a sheet polarization beam splitter arranged on a proceeding path of said incident light branched by the light branching mechanism, wherein said sheet polarization beam splitter converts a proceeding path of said incident light according to a direction of polarization of said incident light;

a reflection display mechanism that generates an image from an incident light polarized in one direction transmitting the sheet polarization beam splitter;

a color prism which selectively transmits or reflects an incident light generated from said reflection display mechanism and transmitting the sheet polarization beam splitter according to a wavelength thereof, a correcting mechanism which corrects an aberration of said incident light caused by said sheet polarization beam splitter, wherein said correcting mechanism is arranged on a proceeding path of said incident light generated from the reflection display mechanism and transmitting the sheet polarization beam splitter; and a projection lens unit for magnifying and projecting a corrected light input from the color prism toward a screen.

8. The projector as claimed in claim 7, wherein the aberration correcting mechanism comprises a correction plate arranged on an optical path between the sheet polarization beam splitter and the screen to be inclined at a predetermnined angle in at least one of a direction in which the sheet polarization beam splitter is inclined and in a reverse direction thereto.

9. The projector as claimed in claim 8, wherein the correction plate has a light incident surface and a light transmitting surface in which an angle made by an optical axis and the light incident surface is different from an angle made by the optical axis and the light transmitting surface.

10. The projector as claimed in claim 7, wherein the aberration correcting mechanism is formed by at least one lens arranged on an optical path between the sheet polarization beam splitter and at least one of the projection lens unit and a lens of the projection lens unit, said at least one lens having at least one of a center of curvature of a light incident surface of said at least one lens and a light transmitting surface of said at least one lens arranged to be shifted from an optical axis.

11. The projector as claimed in claim 7, wherein the aberration correcting mechanism is formed by at least one lens arranged on an optical path between the sheet polarization beam splitter and at least one of the projection lens unit and a lens of the projection lens unit, the at least one lens having a light incident surface and a light transmitting surface in which an angle made by an optical axis and the light incident surface is different from an angle made by the optical axis and the light transmitting surface.

12. The projector as claimed in claim 7, wherein the aberration correcting mechanism is formed by at least one lens arranged on an optical path between the sheet polarization beam splitter and at least one of the projection lens unit and a lens of the projection lens unit, said at least one lens arranged to be shifted from an incident light axis on a plane on which the sheet polarization beam splitter is disposed inclined.

13. The projector as claimed in claim 7, further comprising a band filter arranged on an optical path between the light source and the illumination unit for blocking light within infrared ray and ultraviolet ray ranges of the light emitted from the light source.

14. The projector as claimed in claim 7, further comprising a polarization converter for converting light transmitted from the illumination unit to light polarized in one direction.

15. The projector as claimed in claim 14, wherein the polarization converter comprises:

a cylindrical lens array arranged on said optical path, having an arrangement that focuses and diverges a first incident parallel beam of light and emits a second parallel beam of light having a reduced section compared to the first incident beam;

a plurality of polarization beam splitters arranged on said optical path, which branch the light after passing the cylindrical lens array into first and second light rays according to a wavelength thereof and transmit the first light while reflecting the second light;

a plurality of reflection members, arranged in an area secured by the cylindrical lens array where light is not transmitted, which change an optical path of the second light so that the second light is emitted in a direction parallel to a direction of the first light; and a phase delay plate which delays the phase of at least one of the first light and the second light passing the reflection mirror so that the first light and the second light have the same polarization.

16. The projector as claimed in claim 7, wherein the light branching mechanism comprises:

a first dichromatic mirror arranged on said optical path for branching said incident light according to a wavelength range thereof; and a second dichromatic mirror arranged on said optical path for branching the light branched by the first dichromatic mirror according to a wavelength thereof, so that an incident white light ray of a predetermined polarization is branched to red, blue and green light rays.

17. The projector as claimed in claim 7, further comprising a polarizer arranged between the illumination unit and the sheet polarization beam splitter so that light polarized in one direction of the incident light proceeds toward the sheet polarization beam splitter.

18. A projector comprising:

a light source;

a relay lens unit which receives a light from said light source, wherein said relay lens unit guides said light by focusing and diverging said light;

a sheet polarization beam splitter which receives said light from said relay lens unit, reflects a light polarized in a first direction, and transmits a light polarized in a second direction;

a reflection display mechanism which receives said light polarized in a first direction from the sheet polarization beam splitter, changes said light polarized in a first direction to light polarized in a second direction, and reflects said light polarized in a second direction back toward the sheet polarization beam splitter;

a correction mechanism which receives the light polarized in a second direction transmitted by the sheet polarization beam splitter and corrects an aberration of the light polarized in a second direction caused by said sheet polarization beam splitter; and a projections lens unit which receives the corrected light polarized in a second direction from the correction mechanism, magnifies said light polarized in a second direction, and projects said light polarized in a second direction toward a screen.

19. A reflection projector comprising:

a light source;

an illumination unit which converts a light emitted from said light source to a uniform light;

a polarization converter which converts a non-polarized light emitted from said light source to a light polarized in one direction;

a relay lens unit which guides a proceeding path of said light polarized in one direction by at least one of focusing and diverging said light polarized in one direction;

a light branching mechanism which branches said light polarized in one direction along a plurality of proceeding paths according to a wavelength range thereof;

a plurality of sheet polarization beam splitters which convert said plurality of proceeding paths of a plurality of light beams branched by the light branching mechanism;

a plurality of reflection display mechanisms which generate an image from said plurality of beams which transmit said plurality of sheet polarization beam splitters; a color prism which projects an image generated from the plurality of reflection display mechanisms along a single optical path;

a correction mechanism which corrects an aberration caused by said plurality of sheet polarization beam splitters; and a projection unit which magnifies and transmits said light input from said color prism.

\* \* \* \* \*